United States Patent

Syversen

[15] 3,685,188
[45] Aug. 22, 1972

[54] LICENSE PLATE SECURITY LOCKING DEVICE

[72] Inventor: James Syversen, 402 45th St., Brooklyn, N.Y. 11220

[22] Filed: Aug. 26, 1970

[21] Appl. No.: 67,092

[52] U.S. Cl. .................................................. 40/201
[51] Int. Cl. ............................................. G09f 7/00
[58] Field of Search..293/69 R; 70/371; 40/200, 209, 40/201, 2.2

[56] References Cited

UNITED STATES PATENTS

| 1,283,150 | 10/1918 | Gilmore | 40/201 |
| 1,821,053 | 9/1931 | Dietz et al | 40/209 X |
| 2,831,280 | 4/1958 | McCulley | 40/209 X |

FOREIGN PATENTS OR APPLICATIONS

| 673,822 | 11/1963 | Canada | 40/209 |

Primary Examiner—Robert W. Michell
Assistant Examiner—Wenceslao J. Contreras
Attorney—Strauch, Nolan, Neale, Nies & Kurz

[57] ABSTRACT

A license plate fastening and locking system by which a motor vehicle license plate is locked in place directly on a support, e.g., the bumper, of a motor vehicle. At least one key operated locking member fastens the license plate to the bumper. The locking member includes an outer cylinder passing through openings in the license plate and bumper, with the outer cylinder having an annular end collar clamping the license plate against the outer face of the bumper. A key plug extends through a central bore of the outer cylinder and is key operated between unlocked and locked positions. When moved to the locked position, the plug actuates a locking retaining member positioned adjacent the inner end of the cylinder into locking engagement with the inner face of the bumper to prevent unauthorized removal of the license plate and/or locking member from the bumper.

5 Claims, 5 Drawing Figures

PATENTED AUG 22 1972 3,685,188

INVENTOR
JAMES SYVERSEN

BY Strauch, Nolan, Neale, Nies & Kurz
ATTORNEYS

LICENSE PLATE SECURITY LOCKING DEVICE

BACKGROUND OF THE INVENTION

This invention relates generally to license plate mounting devices and more particularly to a novel manner and apparatus for locking the license plate of a motor vehicle directly to a support element, for example the bumper of the vehicle, to prevent unauthorized removal and theft of the license plate.

The theft of license plates from motor vehicles is becoming more and more common, particularly in urban areas, and is creating an acute problem not only for the owner of the motor vehicle, but also for the government agencies responsible for registration of vehicles and maintaining records correlating a particular license plate number to a specific vehicle. In the past, license plates have generally been fastened to the motor vehicles simply by a number of bolt and nut assemblies which, of course, are readily removable. As a result, unauthorized removal and theft of the license plate is easily accomplished and the plates may then be used on unauthorized vehicles. The owner of the registered vehicle is put to the inconvenience and cost of obtaining a new license plate and the government agency no longer has a means of identifying a specific vehicle with the license plate which was stolen.

SUMMARY OF THE INVENTION

Accordingly, a primary object of the invention resides in the provision of a novel license plate mounting assembly which is substantially fool-proof against theft and which may be key-operated only by authorized persons to permit removal of the license plate from the vehicle.

Another object of the invention resides in the provisions of a novel license plate mounting system by which the plate is connected directly to a support element, for example the bumper of a motor vehicle by way of at least one key-operated locking mechanism which may be operated to permit removal of the license plate only by authorized persons possessing a proper key.

Still another object of the invention resides in the provision of a novel license plate mounting system such as that noted in the previous objects in which the key-operated locking member includes an outer cylinder having an annular collar which retains the license plate against the exposed face of the bumper and an inner key plug rotatable within the outer cylinder between unlocked and locked positions. When the plug is moved to the locked position, it actuates locking retainer means at the inner end of the cylinder into locking engagement with the inner hidden face of the bumper, thereby preventing unauthorized removal of the license plate and locking mechanism from the bumper.

A further object of the invention resides in the provision of a novel license plate mounting system as discussed in the prior objects wherein the locking mechanism employed for locking the license plate onto the bumper may be of any conventional tumbler lock type which are operated in the usual manner only by a specific key which would be in the possession of the vehicle owner or other persons authorized by him.

Other objects and advantages of the invention will become more apparent from reading the following detailed description of the invention with reference to the accompanying drawings in which like numerals indicate like elements. However, it is understood that the scope of the invention is not limited by the illustrative embodiments, but is determined solely by the appended claims.

DETAILED DESCRIPTION OF THE INVENTION

Figure 1:
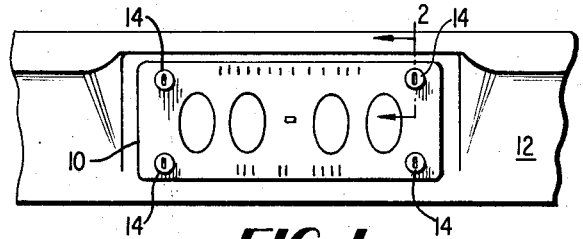
FIG. 1 is a fragmentary elevation view of a license plate mounted on a support element, for example the front bumper, of a motor vehicle by way of a novel key-operated locking mechanism of the invention.

Referring now to the drawings, the license plate 10 is mounted directly on a bumper 12 of a motor vehicle by way of a plurality of key-operated locking mechanisms 14, each of which extends through aligned openings 16 and 18 provided in the license plate 10 and bumper 12, respectively.

Figure 2:
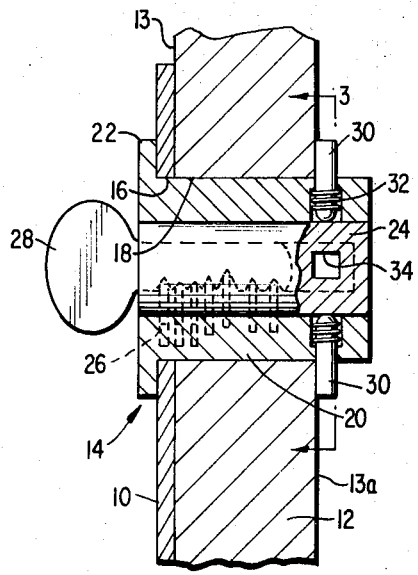
FIG. 2 is a fragmentary sectional view taken generally along line 2—2 of the FIG. 1 and illustrating a typical key-operated mechanism which may be employed for locking the license plate to the bumper.
Figure 3:
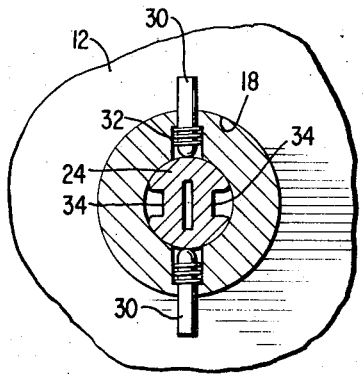
FIG. 3 is a fragmentary sectional view taken along line 3—3 of FIG. 2.

Referring specifically to FIGS. 2 and 3, locking mechanism 14 includes an outer cylinder or barrel 20 which snugly extends through openings 16 and 18, with the outer end of barrel 20 having an enlarged diameter annular collar 22 which abuts against the exposed face of license plate 10 and clamps the plate snugly against the outer exposed face 13 of bumper 12. A key plug 24 fits within the central bore of barrel 20 and a plurality of tumbler pins 26 cooperate between barrel 20 and plug 24 in the usual conventional manner to fix plug 24 against axial movement within the barrel 20 but permit rotation of the plug within the barrel between unlocked and locked positions upon insertion of the proper key 28.

A pair of retractable retaining pins 30 are mounted at the inner end of barrel 20 and are normally biased radially inwardly by springs 32. Key plug 24 has a pair of recesses 34 at its inner end, and when plug 24 is in the unlocked position (90° from that shown in FIG. 3), recesses 34 receive the inner end of pins 32 as they are retracted into an unlocking position on barrel 20.

To mount the license plate 10 on bumper 12, plug 24 will be positioned by key 28 in an unlocked position in which the inner ends of pins 30 are received in recesses 34. Consequently, the outer ends of pins 30 will be recessed beneath the peripheral surface of barrel 20 which then may be inserted in place through openings 16 and 18 until collar 22 snugly clamps license plate 10 against the exposed face 13 of bumper 12. Plug 24 is then turned by key 28 to its locked position as shown in FIG. 3, whereby the outer peripheral surface of plug 24 engages the inner ends of pins 30 and causes the pins to project radially outwardly from the barrel 20 into retaining abutting engagement with the inner hidden face 13a of bumper 12. Key 28 is then removed from plug 24 and pins 30 prevent unauthorized removal of lock mechanism 14 from bumper 12 and the annular collar 22 prevents unauthorized removal of license plate 10 from the exposed face of the bumper. As a result, only authorized persons possessing the proper key 28 may readily remove the license plate 10 from the bumper.

As previously mentioned, any type of conventional key-operated lock mechanism 14 may be employed in the invention, so long as the mechanism includes a front annular collar, such as collar 22, to clamp the license plate against the exposed face of the bumper and an inner retainer means, such as pins 30, to prevent unauthorized removal of the lock mechanism and license plate from the bumper.

Figure 4:
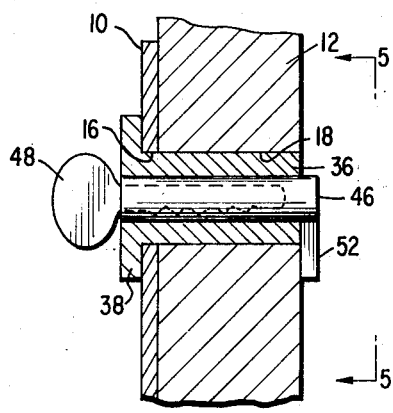
FIG. 4 is a fragmentary sectional view similar to that of FIG. 2, but illustrating another type of key-operated locking mechanism which may be employed in the invention.
Figure 5:
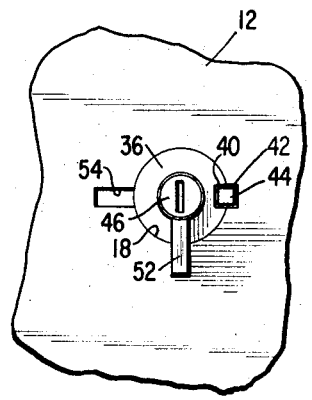
FIG. 5 is a fragmentary view taken generally along line 5—5 of FIG. 4.

For example, referring now to FIGS. 4 and 5, another type of lock mechanism which may be employed in the invention includes an outer barrel 36 which snugly extends through openings 16 and 18 in license plate 10 and bumper 12, respectively, with the barrel 36 having an enlarged annular collar 38 abutting against the exposed face of license plate 10 and clamping the plate against bumper 12. A keyway slot 40 extends along one side of barrel 36 and cooperates with an opposed slot 42 through bumper 12 to receive a key 44 which retains barrel 36 against rotation in bumper opening 18. A key plug 46 extends through the central bore of barrel 36 and is connected thereto by the conventional pin tumblers (not shown) which cooperate between plug 46 and barrel 36 to prevent relative axial movement therebetween, while at the same time permitting rotation of plug 46 upon insertion of a proper key 48. The inner end of plug 46 has a radially extending end lug 52 projecting beyond the outer periphery of barrel 36. Another slot 54 extends through bumper 12 to receive lug 52 when the lock mechanism is being inserted through the bumper to fasten plate 10 thereto.

To lock the license plate in place against bumper 12, plug 46 is rotated to its inoperative unlocking position by key 48 so that lug 52 will align with slot 54 in bumper 12 and permit the barrel 36 to be placed through openings 16 and 18 until the annular collar 38 abuts against license plate 10. Of course, keyways 40 and 42 will also be aligned so that the key 44 may be readily placed therein to prevent rotation of barrel 36. Plug 46 is then rotated to its locked position, shown in FIG. 5, so that lug 52 will abut against the inner face of bumper 12 and key 48 is removed. Consequently, lug 52 prevents unauthorized removal of the lock mechanism from the bumper, and the annular collar 38 lockingly clamps license plate 10 against the bumper.

From the above description, it is readily apparent that the license plate mounting and locking system of the invention ensures that the license plate can not be readily removed from the bumper and, therefore prevents unauthorized removal and use of the license plate. As a result, it will no longer be easy for a thief to steal the license plate and the problems and inconvenience heretofore presented to the vehicle owner and government agencies will be substantially reduced and eliminated.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In combination, a license plate, a support member adapted to be fixed to a motor vehicle, said support member and said license plate having aligned openings, and key-operated lock means extending through said aligned openings and operated by a suitable key for movement between unlocked and locked positions, said lock means having means at its outer end for clamping said plate against one face of said member and retainer means at its inner end for engaging an opposite face of said support member when said lock means is moved to its locked position by said key, thereby securing said plate in a locked position on its support member.

2. In combination, a license plate, a support member adapted to be fixed to a motor vehicle, said support member and said license plate having aligned openings, key-operated means for locking said license plate to said support member thereby preventing unauthorized removal of said license plate from said support member, said key-operated means including a cylinder extending through said openings and having means at its outer end for clamping said plate against one face of said support member, a key plug rotatably mounted within said cylinder for rotation between unlocked and locked positions, and retainer means adjacent the inner end of said cylinder for engaging an opposite face of said support member when said plug is rotated to its locking position by a suitable key, thereby securing said plate in a locked position on said support member.

3. The combination of claim 2, wherein the clamping means on the outer end of said cylinder comprises an enlarged collar which abuts against the visible face of said license plate to clamp it against said support member.

4. The combination of claim 3, wherein said retainer means comprises a radial pin projecting beyond the outer periphery of said cylinder when said key plug is in its locked position, said pin engaging the opposite face of said support member to prevent removal of said license plate from said member.

5. The combination of claim 4, wherein said support member is the bumper of a motor vehicle.

* * * * *